3,326,760
CHOLINE SALICYLATE POLYGALACTURONATE THERAPY
Alfred Halpern, Great Neck, and Ernest J. Sasmor, Yonkers, N.Y., assignors to Synergistics, Inc., New York, N.Y., a corporation of New York
No Drawing. Filed May 17, 1966, Ser. No. 550,606
14 Claims. (Cl. 167—65)

This invention relates to a new solid therapeutic compound, method for its preparation, pharmaceutical compositions employing the same and methods for their use in achieving a therapeutic effect. In particular, it is concerned with choline salicylate polygalacturonate, the method for its preparation, the method for the preparation of pharmaceutical compositions containing the same and their use in therapy.

Choline salicylate is a well known analgesic compound, being the subject of U.S. Patent No. 3,069,321. This compound, while having admirable pharmacologic and therapeutic properties, possesses an inherent limitation of being hygroscopic. The hygroscopic properties of choline salicylate are such that it is not possible to prepare a pharmaceutically acceptable solid dosage form for oral administration which exhibits any practical degree of shelf-life stability. Even when rigid conditions of storage are employed, trace amounts of moisture are sufficient to reduce pharmaceutical compositions containing choline salicylate to a liquid state.

While the liquid dosage forms are perfectly stable and the hygroscopic properties do not in any way effect or influence the pharmacologic activities or therapeutic properties, the advantages of having available a choline salicylate pharmaceutical solid preparation, such as tablets, capsules, granules or powders, resides in the ease with which these preparations may be administered and the greater prescribing flexibility provided to the clinician by the availability of these solid dosage forms.

It was found that choline salicylate may be converted into a solid compound by polygalacturonic acid, and this new compound was capable of being compounded into solid pharmaceutical dosage forms, which were stable under the ordinary conditions of storage for periods in excess of 4 years. This new compound, choline salicylate polygalacturonate, is formed by the interreaction of choline salicylate with polygalacturonic acid in aqueous alcoholic or hydroalcoholic media, to result in a homogenous, solid compound which has reproducible physical and chemical characteristics.

The appropriate quantity of polygalacturonic acid is added to an aqueous, alcoholic, or hydroalcoholic solution of choline salicylate and the mixture stirred for a period of 20 minutes. The liquid phase is then removed either by evaporation under reduced pressure or by distillation and the residue dried to obtain a free-flowing powder containing between 55 percent and 65 percent of choline salicylate and 35 percent to 45 percent of polygalacturonic acid.

Choline salicylate polygalacturonate is a free-flowing, off-white granular powder which is capable of being milled to any desired particle size. It contains 23.4% of choline base and 30.9% of salicyclic acid. The ultraviolet absorption spectrum for choline salicylate polygalacturonate has a maxima at 295 m$\mu$ and a minima at 260 m$\mu$. Choline salicylate polygalacturonate is insoluble in water and ethanol, in contrast to the compound, choline salicylate. When adminstered to animals choline salicylate polygalacturonate exhibits the same order of toxicity and scope of therapeutic activity as does choline salicylate, thereby preserving the full pharmacologic spectrum of the precursor compound. When subjected to stability testing, choline salicylate polygalacturonate is found to be stable for a period in excess of 4 years. When exposed to the atmosphere, it does not liquify and may be utilized without special precautions in manufacturing procedures and techniques.

The new compound choline salicylate polygalacturonate may be compounded into tablets, capsules, granules and powders without any special precautions against hygroscopicity. In the preparation of tablets, the appropriate quantity of choline salicylate polygalacturonate is mixed with a granulating aid, such as are well known in the art, and a tablet lubricant as for example, magnesium stearate is added in a concentration of up to 0.5% of the weight of choline salicylate polygalacturonate used. Depending upon the size of the individual tablets required, appropriate pharmaceutical diluents may be added. Such diluents as polyvinylpyrrolidone, polyvinyl alcohol, lactose, and sucrose may be used in sufficient quantity, depending upon the size of the tablet to be manufactured. The use of diluents, however, is not essential to the preparation of tablets, since choline salicylate polygalacturonate may be compressed into tablets without any further treatment.

The mixture of active material is granulated by moistening with a small amount of alcohol and passing the mixture through a Fitzpatrick comminutor. The granulated material is then dried and compressed into tablets of suitable size and shape.

Capsules may be prepared by directly filling choline salicylate polygalacturonate into capsules of appropriate size and shape. Should it be desired to use diluents, then those pharmaceutically acceptable diluents, as are employed in the manufacture of tablets, may be used.

For the preparation of granules, the mixture prepared for tablets may be used. The material is granulated through a No. 8 standard mesh sieve. It is not necessary to add a tablet lubricant when granules are being prepared, although the presence of a lubricant does not alter the granular form. Powders are prepared by subdividing the milled choline salicylate polygalacturonate into appropriate sized dosage units. The particle size of the powder may range from that of at least a No. 60 standard mesh size to that of micron particle size.

When used in therapy, the compound may be administered from 1 to 6 times per day, depending upon the individual needs of the patient. The individual dosage forms are prepared to contain from 1 grain of active compound to 20 grams of active compound per unit dose. As much as 120 grains of choline salicylate polygalacturonate may be administered per day. The individual dosage forms, when administered to a patient, provide a rapid absorption of the respective therapeutic moieties to result in the full pharmacologic and therapeutic spectrum desired for choline salicylate. The following examples illustrate the scope of this invention.

*Example 1*

An aqueous solution, containing 54.35 gm. of choline salicylate in 50 cc. of water is mixed with 45.65 gm. of polygalacturonic acid and the whole stirred until the aqueous phase is completely absorbed by the polygalacturonic acid. The mixture is then tumbled or mixed for a period of 20 minutes and the semi-dry mass passed through a Fitzpatrick mill, using a No. 4 screen with the hammers in a forward position at 2500 r.p.m. The resultant granule material is then air-dried at 115° F. The material is then ground to a smaller particle size as, for example, a No. 60 mesh, and may then be utilized for further pharmaceutical dosage for manufacture.

Choline salicylate polygalacturonate obtained in the above manner contains 23.4% of choline base and 30.9% of salicylic acid. The pH of a 1 percent dispersion is pH 5.5. The compound is a free-flowing, off-white granular powder which is insoluble in water and ethanol. The ultra-violet absorption shows a maxima at 295 m$\mu$ and a minima at 260 m$\mu$. The compound is stable under the ordinary conditions of storage and does not indicate any hygroscopicity.

*Example 2*

To 100 gm. of polygalacturonic acid is added 24 gm. of choline base and 31 gm. of salicylic acid. The dried powders are intimately mixed and to this is added 100 ml. of 70% of ethanol-water mixture. The whole is stirred for a period of 20 minutes and then dried overnight. The dried mixture is then milled to its desired particle size and is suitable for further pharmaceutical manufacturing. The choline salicylate polygalacturonate obtained in this manner compares in every way with that obtained as a result of Example 1 above.

*Example 3*

Solid pharmaceutically acceptable dosage forms may be prepared from choline salicylate polygalacturonate. When it is desired to prepare tablets then these may be compounded by mixing with 100 parts of choline salicylate polygalacturonate, 1 part of gum acacia and ½ part of magnesium stearate. The mixture is stirred and moistened with 70% ethanol and the wet material passed through a Fitzpatrick mill, using a No. 4 screen. The granulated powder is then dried in an oven overnight and compressed into tablets of suitable size and shape, so that each tablet contains from 1 grain to 20 grains of choline salicylate polygalacturonate. Should it be desired to add diluents then from 1/10 to 5 parts of milk sugar, polyvinylpyrrolidone, polyvinyl alcohol, mannitol and sucrose for each part of choline salicylate polygalacturonate may be used. The diluents are added, together with the granulating agent and table lubricant, with the remainder of the steps remaining the same.

Should capsules be desired, then the active material may be filled directly into capsules, so that each capsule contains from 1 grain to 20 grains of active compound per unit does. Should it be desired to add a diluent to the active ingredient in the preparation of capsules, then the diluents described above for the preparation of tablets may be utilized in the same ratio.

In the preparation of granules, the tablet granulation is utilized and granulated to a particle size of a No. 8 standard mesh screen. The material is dried and packaged as unit dose of granules, containing from 1 grain to 20 grains of active compound.

Powders are prepared by mixing the active compound with from 1/10 part to 5 parts of a diluent selected from the group consisting of milk sugar, polyvinylpyrrolidone, polyvinyl alcohol, mannitol, starch and sucrose. After thorough mixing, the powdered material is milled to a particle size of at least a No. 60 standard mesh or finer, and then subdivided into unit dosage of appropriate weight, so that each unit dose contains from 1 grain to 20 grains of active material.

*Example 4*

When it is desired to utilize pharmaceutical dosage forms of choline salicylate polygalacturonate in therapy, then the selected dosage form is administered to the patient from 1 to 6 times daily, according to individual needs. As much as 120 grains per day of active compound may be administered. Pharmaceutical compositions containing choline salicylate polygalacturonate are especially well tolerated and do not cause gastrointestinal distress. Absorption of the active material is prompt and blood levels of choline and salicylic acid are obtained within 15 minutes after oral administration.

What is claimed is:

1. Choline salicylate polygalacturonate.
2. The method of preparing choline salicylate polygalacturonate which comprises the steps of mixing a reagent selected from the group consisting of choline salicylate, choline base, salicylic acid, and mixtures of these with polygalacturonic acid, moistening the mixture with a liquid selected from the group consisting of water, ethanol and mixtures of these, stirring for a period of at least 20 minutes, drying the material and recovering the formed choline salicylate polygalacturonate therefrom.
3. The method of claim 2, in which said reagent is a solution of choline salicylate.
4. The method of claim 2, in which said reagent is choline base and salicylic acid.
5. The method of claim 2, in which said liquid is water.
6. The method of claim 2, in which said liquid is ethanol.
7. The method of claim 2, in which said liquid is 70% aqueous ethanol.
8. A pharmaceutical composition comprising a pharmaceutically acceptable carrier and from 1 to 20 grains of choline salicylate polygalacturonate.
9. A pharmaceutical composition of claim 8 in unit dosage form, said dosage form being a tablet comprising a pharmaceutically acceptable carrier and from 1 to 20 grains of choline salicylate polygalacturonate.
10. A pharmaceutical composition of claim 8 in unit dosage form, said dosage form being a capsule comprising from 1 to 20 grains of choline salicylate polygalacturonate.
11. A pharmaceutical composition of claim 8 in unit dosage form, said dosage form being a granule comprising a pharmaceutically acceptable carrier and from 1 to 20 grains of choline salicylate polygalacturonate, the whole being granulated to a particle size of not less than No. 10 standard mesh.
12. The method of achieving choline salicylate therapy in a patient which comprises the step of administering a therapeutically sufficient quantity of choline salicylate polygalacturonate.
13. The method of obtaining choline salicylate therapy in a patient which comprises the step of administering from 1 to 20 grains of choline salicylate polygalacturonate.
14. The method of obtaining choline salicylate therapy in a patient which comprises the step of administering a therapeutically sufficient amount of a pharmaceutical composition in unit dosage form containing choline salicylate polygalacturonate and a pharmaceutical carrier.

References Cited

UNITED STATES PATENTS 3,069,321   12/1962   Broh-Kahn _____ 167—65

ALBERT T. MEYERS, *Primary Examiner.*

STANLEY J. FRIEDMAN, *Assistant Examiner.*